US011021993B2

(12) United States Patent
Kuboya et al.

(10) Patent No.: US 11,021,993 B2
(45) Date of Patent: Jun. 1, 2021

(54) THERMAL INSULATION COATING MEMBER, AXIAL FLOW TURBINE, AND METHOD FOR PRODUCING THERMAL INSULATION COATING MEMBER

(71) Applicant: TOSHIBA ENERGY SYSTEMS & SOLUTIONS CORPORATION, Kawasaki (JP)

(72) Inventors: Satoru Kuboya, Kawasaki (JP); Kunihiko Wada, Yokohama (JP); Daizo Saito, Yokohama (JP); Masataka Tamura, Yokohama (JP); Nobuhiro Okizono, Yokohama (JP); Iwataro Sato, Hiratsuka (JP); Hideyuki Maeda, Yokohama (JP); Takeo Takahashi, Yokohama (JP)

(73) Assignee: TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 178 days.

(21) Appl. No.: 16/249,978

(22) Filed: Jan. 17, 2019

(65) Prior Publication Data
US 2019/0153892 A1 May 23, 2019

Related U.S. Application Data

(63) Continuation of application No. PCT/JP2016/003438, filed on Jul. 22, 2016.

(51) Int. Cl.
*F01D 25/08* (2006.01)
*C23C 4/11* (2016.01)
(Continued)

(52) U.S. Cl.
CPC .............. *F01D 25/08* (2013.01); *C23C 4/02* (2013.01); *C23C 4/11* (2016.01); *C23C 4/12* (2013.01);
(Continued)

(58) Field of Classification Search
None
See application file for complete search history.

(56) References Cited

U.S. PATENT DOCUMENTS 9,194,242 B2 * 11/2015 Lee ........................ C23C 28/042
2014/0065361 A1    3/2014 Rosenzweig et al.
2017/0081250 A1 *  3/2017 Kamel .................... C04B 41/80

FOREIGN PATENT DOCUMENTS

JP         63-62858      3/1988
JP       2010-121203      6/2010
(Continued)

OTHER PUBLICATIONS

International Search Report dated Oct. 25, 2016 in PCT/JP2016/003438 filed on Jul. 22, 2016 (with English Translation).

*Primary Examiner* — Juan G Flores
(74) *Attorney, Agent, or Firm* — Oblon, McClelland, Maier & Neustadt, L.L.P.

(57) ABSTRACT

A thermal insulation coating member includes: a substrate having a surface; a binding layer on the surface, and a thermal insulation layer on the binding layer. The thermal insulation layer includes: a first ceramic layer including a plurality of first flat pores, the plurality of first flat pores being inclined at a first angle with respect to the surface and extending in a first direction; and a second ceramic layer including a plurality of second flat pores, the plurality of second flat pores being inclined at a second angle with respect to the surface and extending in a second direction. The second angle differs from the first angle, the second direction differing from the first direction, or the second (Continued)

angle and the second direction respectively differing from the first angle and the first direction.

8 Claims, 6 Drawing Sheets

(51) Int. Cl.
| | |
|---|---|
| *C23C 4/12* | (2016.01) |
| *F01D 5/28* | (2006.01) |
| *F01D 9/02* | (2006.01) |
| *F01D 25/14* | (2006.01) |
| *C23C 4/18* | (2006.01) |
| *C23C 4/02* | (2006.01) |
| *F02C 7/00* | (2006.01) |
| *C23C 28/00* | (2006.01) |

(52) U.S. Cl.
CPC ............ *C23C 4/18* (2013.01); *C23C 28/3215* (2013.01); *C23C 28/3455* (2013.01); *C23C 28/36* (2013.01); *F01D 5/28* (2013.01); *F01D 5/284* (2013.01); *F01D 5/288* (2013.01); *F01D 9/02* (2013.01); *F01D 25/145* (2013.01); *F02C 7/00* (2013.01); *F05D 2220/32* (2013.01); *F05D 2230/90* (2013.01); *F05D 2300/20* (2013.01)

(56) References Cited

FOREIGN PATENT DOCUMENTS

| JP | 2011-195945 | 10/2011 |
|---|---|---|
| JP | 2015-533934 | 11/2015 |

* cited by examiner

FIG.8

| | PROJECTION ANGLE | PEELING RESISTANCE |
|---|---|---|
| EXAMPLE 1 | $\theta 1=45°$、$\theta 2=135° \Leftrightarrow \theta 1=45°$、$\theta 3=45°$ | NOT PEELED |
| COMPARATIVE EXAMPLE 1 | $\theta 1=45°$、$\theta 2=135°$ | PEELED at 15th PROCESS |
| COMPARATIVE EXAMPLE 2 | $\theta 1=90°$、$\theta 2=90°$ | NOT PEELED |

US 11,021,993 B2

THERMAL INSULATION COATING MEMBER, AXIAL FLOW TURBINE, AND METHOD FOR PRODUCING THERMAL INSULATION COATING MEMBER

CROSS-REFERENCE TO RELATED APPLICATIONS

This application is a continuation of prior International Application No. PCT/JP2016/003438 filed on Jul. 22, 2016; the entire contents of all of which are incorporated herein by reference.

FIELD

Embodiments described herein generally relate generally to a thermal insulation coating member, an axial flow turbine, and a method for manufacturing the terminal insulation coating member.

BACKGROUND

An axial flow turbine such as a gas turbine used in a power plant and the like rotates moving blades with working fluid, whereby power is taken as a torque. For the purpose of improving power generation efficiency of the power plant, attempts have been made to, e.g., set the temperature of working fluid for the axial flow turbine to a higher temperature.

During operation of the axial flow turbine, a high-temperature member such as moving blades or stationary blades is exposed to working fluid, so that the temperature of the high-temperature member exposed to the working fluid increases with an increase in temperature of the working fluid. To thermally protect the high-temperature member, a thermal insulation layer made of ceramic having a thermal conductivity lower than that of metal is coated on the surface of the high-temperature member.

The thermal insulation layer is formed on the high-temperature member by means of, e.g., thermal spraying. The "thermal spraying" refers to a method of forming a layer by projecting particles (hereinafter, referred to also as "thermal spray particles") onto the surface of the high-temperature member while melting them. Generally, in the thermal spraying, the durability of the thermal insulation layer formed on the surface of the high-temperature member becomes lower as the projection angle of the thermal spray particles with respect to the surface of the high-temperature member becomes smaller, with the result that the thermal insulation layer may be peeled off from the high-temperature member. Thus, during the thermal spraying, the thermal spray particles are projected at an angle as large as possible with respect to the surface of the high-temperature member so as to enhance the durability of the thermal insulation layer.

In recent years, a gas turbine (hereinafter, referred to also as "$CO_2$ turbine") configured to be driven by working fluid composed of combustion gas, carbon dioxide, and the like generated by combustion of fuel such as natural gas with oxygen has been developed. A part of carbon dioxide contained in the working fluid that drives the $CO_2$ turbine is easily recovered from bleed air, while carbon dioxide that has not been recovered is circulated to a combustor. In this way, the $CO_2$ turbine can perform power generation and recovery of carbon dioxide simultaneously and does not emit nitrogen oxide during operation. Thus, the $CO_2$ turbine attracts attention in terms of global environmental protection.

While the $CO_2$ turbine is operated, carbon dioxide in the turbine is in a super critical state. The working fluid in the $CO_2$ turbine is in a high-temperature and high-pressure state, so that the power generation efficiency of the $CO_2$ turbine is improved. On the other hand, the high-temperature member constituting the $CO_2$ turbine is exposed to the high-temperature working fluid. Further, a sealing structure for suppressing the working fluid from being leaked outside is provided in the $CO_2$ turbine in order to increase the pressure in the turbine.

BRIEF DESCRIPTION OF THE DRAWINGS

FIG. 8 shows an evaluation result of peeling resistance in Example and Comparative examples.

DETAILED DESCRIPTION

Figure 1:
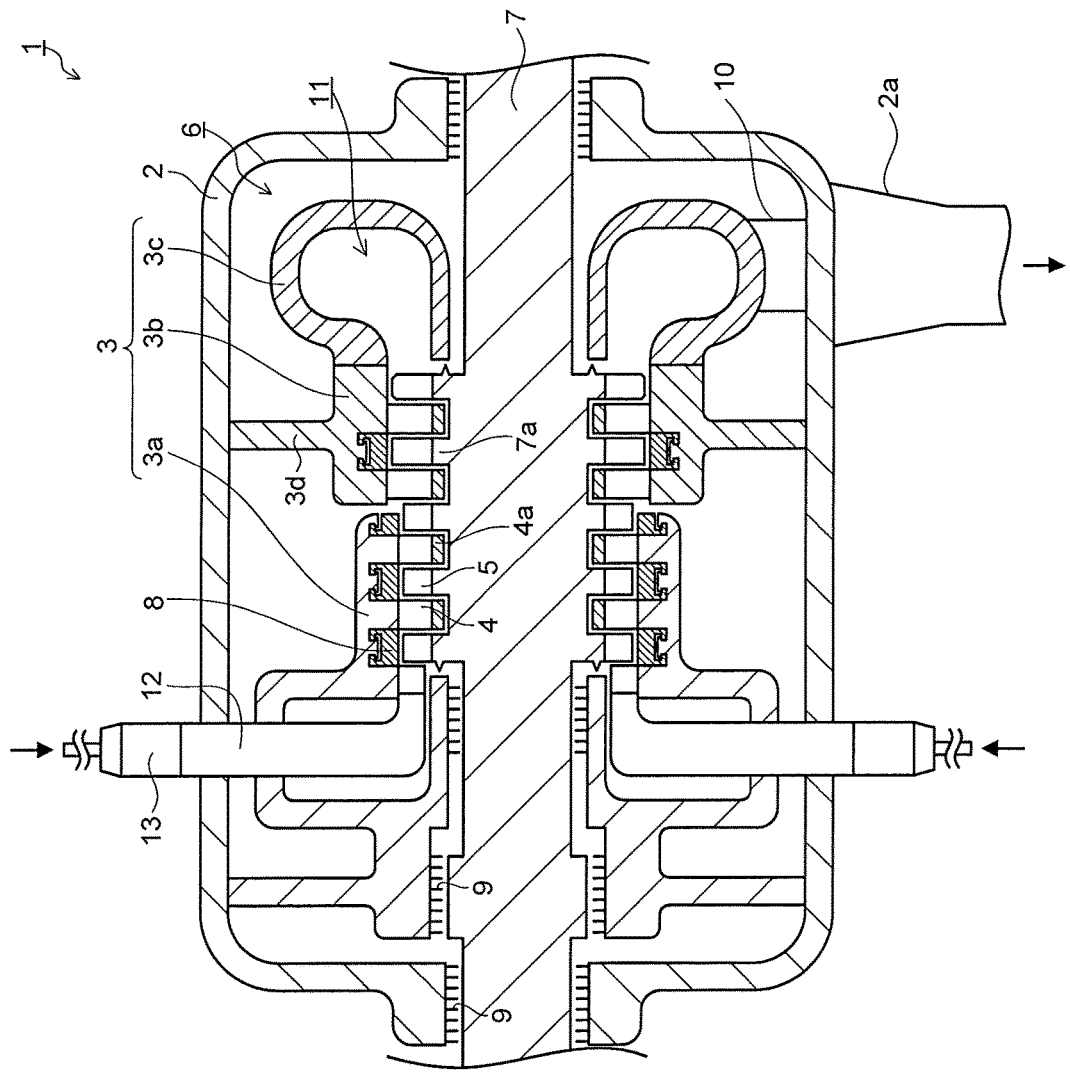
FIG. 1 is a schematic view illustrating a part of the cross section of an axial flow turbine provided with a thermal insulation coating member according to an embodiment.

A thermal insulation coating member comprises: a substrate having a surface; a binding layer on the surface; and a thermal insulation layer on the binding layer. The thermal insulation layer includes: a first ceramic layer having a plurality of first flat pores, the first flat pores being inclined at a first angle with respect to the surface and extending in a first direction; and a second ceramic layer having a plurality of second flat pores, the second flat pores being inclined at a second angle with respect to the surface and extending in a second direction. The second angle differs from the first angle, the second direction differing from the first direction, or the second angle and the second direction respectively differing from the first angle and the first direction.

As described above, the $CO_2$ turbine is provided with a complicated structure such as the above-mentioned sealing structure in order to achieve a high-pressure state, so that many narrow portions exist in the $CO_2$ turbine. In the $CO_2$ turbine having many narrow portions, it may be sometimes difficult to project the thermal spray particles at a large angle. When the thermal insulation layer is formed by projecting the thermal spray particles at a low angle, the durability of the thermal insulation layer is deteriorated.

When the thermal insulation layer whose durability is deteriorated is peeled off, thermal insulation for the high-temperature member constituting the $CO_2$ turbine is deteriorated, which may cause cracks in the high-temperature member.

Further, recently, also for existing axial flow turbines, a complicated structure such as the sealing structure is introduced in order to improve power generation efficiency. Thus, the existing axial flow turbines also have narrow portions, so that the thermal insulation layer formed in the narrow portion has a problem in terms of durability.

The object of the present invention is to provide a thermal insulation coating member, an axial flow turbine, and a thermal insulation coating member manufacturing method capable of maintaining the durability of the thermal insulation layer formed on the surface of the high-temperature member even in a narrow portion and thus of ensuring high thermal insulation for the high-temperature member.

A thermal insulation coating member according to the embodiment includes: a substrate; a binding layer formed on a surface of the substrate; and a thermal insulation layer formed on a surface of the binding layer. The thermal insulation layer is composed of a plurality of ceramic layers containing a plurality of flat pores inclined with respect to the surface of the substrate. The plurality of ceramic layers includes at least two layers of a first ceramic layer and a second ceramic layer. The first ceramic layer contains a plurality of flat pores inclined at a first angle with respect to the surface of the substrate and extending in a first direction, and the second ceramic layer is formed on a surface of the first ceramic layer and contains a plurality of flat pores inclined at a second angle with respect to the surface of the substrate and extending in a second direction. The second angle differs from the first angle and/or the second direction differs from the first direction.

Hereinafter, an embodiment of the present invention will be described with reference to the accompanying drawings.

FIG. 1 is a schematic view illustrating a part of the cross section of an axial flow turbine 1 provided with a thermal insulation coating member according to the embodiment. In this example, the axial flow turbine 1 is a $CO_2$ turbine, but not limited to this, and may be a conventional gas turbine using, as working fluid, gas generated by combustion of various kinds of fuel such as natural gas. In the $CO_2$ turbine, a part of carbon dioxide generated in a combustor 13 is compressed to supercritical fluid and circulated in the working fluid system.

As illustrated in FIG. 1, the axial flow turbine 1 has a double structure casing constituted of an outer casing 2 and an inner casing 3 provided inside the outer casing 2. The inner casing 3 has inner casings 3a and 3b surrounding a turbine stage provided with stationary blades 4 and moving blades 5 and an inner casing 3c constituting a part of an exhaust chamber 6 into which the working fluid that has passed through a last turbine stage.

An exhaust tube 2a for exhausting the working fluid is provided on the lower half side of the outer casing 2 on the downstream side so as to extend downward.

A turbine rotor 7 is penetratingly provided inside the inner casing 3. A plurality of rotor disks 7a are arranged along the turbine rotor axial direction (hereinafter, also referred to merely as "axial direction") of the turbine rotor 7 so as to protrude radially outward along the periphery of the turbine rotor 7. A plurality of moving blades 5 are peripherally implanted in the rotor disk 7a to constitute a moving blade cascade, and a plurality of the moving blade cascades are formed in the axial direction. The turbine rotor 7 is rotatably supported by a not-shown rotor bearing.

The outer periphery of each moving blade 5 is surrounded by a shroud segment 8. The shroud segment 8 is provided to prevent heat of the working fluid from entering the inner casing 3 and to properly adjust a gap with the leading end of the moving blade 5.

Figure 2:
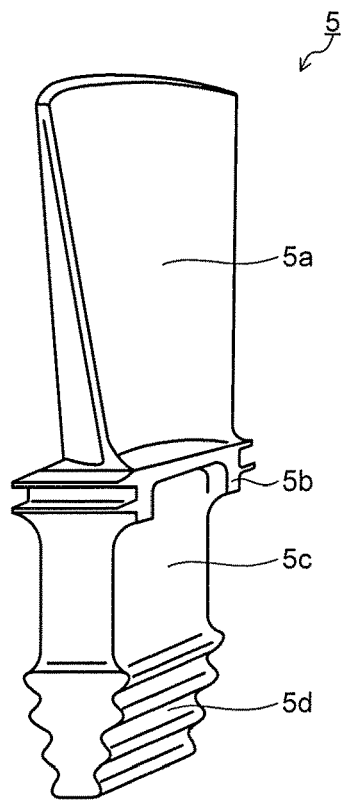
FIG. 2 is a perspective view illustrating the moving blade of the axial flow turbine provided with the thermal insulation coating member according to the embodiment.

FIG. 2 is a perspective view illustrating the moving blade 5 of the axial flow turbine 1 provided with the thermal insulation coating member according to the embodiment. The moving blade 5 is constituted of a blade effective part 5a, a platform part 5b, a shank part 5c, and an implanted part 5d.

Further, a plurality of stationary blades 4 are peripherally installed inside the inner casings 3a and 3b to constitute a stationary blade cascade. An inner side wall 4a is formed inside each stationary blade 4. A plurality of stationary blade cascades are axially arranged alternately with the moving blade cascades. One stationary cascade and one moving blade cascade positioned immediately downstream of the one stationary cascade constitute one turbine stage.

An annular wall 3d is peripherally formed on the outer peripheral surface of the inner casing 3b so as to protrude radially outward therefrom. For example, the outer peripheral surface of the annular wall 3d contacts the inner periphery of the outer casing 2. Further, a seal part 9 is provided between the turbine rotor 7 and the outer casing 2 and between the turbine rotor 7 and the inner casing 3a so as to prevent the working fluid from leaking outside.

An exhaust chamber 6 is provided downstream of the last turbine stage. The exhaust chamber 6 has the inner casing 3c of an annular shape in which the working fluid that has passed through the turbine stage and an exhaust part 10 provided on the lower half side of the inner casing 3c.

An annular channel 11 is formed around the turbine rotor 7. The annular channel 11 guides the working fluid that has passed through the turbine stage to the exhaust part 10.

The exhaust part 10 is formed inside the exhaust tube 2a of the outer casing 2 so as to extend downward along the exhaust tube 2a. The working fluid that has passed through the exhaust part 10 is exhausted outside the outer casing 2 through the exhaust tube 2a.

Further, the axial flow turbine 1 is provided with a transition piece 12 that exhausts the working fluid flowing thereinto from the combustor 13 to the first turbine stage. The working fluid that has been exhausted to the turbine stage from the transition piece 12 flows inside the inner casings 3a and 3b while performing expansion work and then passes through the last turbine stage.

In the axial flow turbine 1, the thermal insulation coating member according to the embodiment can be applied to some or all of the high-temperature members such as the stationary blade 4, inner side wall 4a, moving blades 5, platform part 5b, shroud segment 8, and transition piece 12, and a thermal insulation layer is formed on at least a part of the surface of a substrate constituting the thermal insulation coating member. For example, when the thermal insulation coating member according to the embodiment is applied to the stationary blade 4, inner side wall 4a, moving blades 5, or platform part 5b, the thermal insulation layer is formed on the outer surface of the substrate constituting the thermal insulation coating member. When the thermal insulation coating member is applied to the shroud segment 8 or transition piece 12, the thermal insulation layer is formed on the inner surface of the substrate constituting the thermal insulation coating member.

Further, even in a case where the axial flow turbine 1 is a conventional gas turbine, the thermal insulation coating member according to the embodiment can be applied to the high-temperature members described above.

Next, the thermal insulation coating member according to the embodiment will be described in detail.

Figure 3:
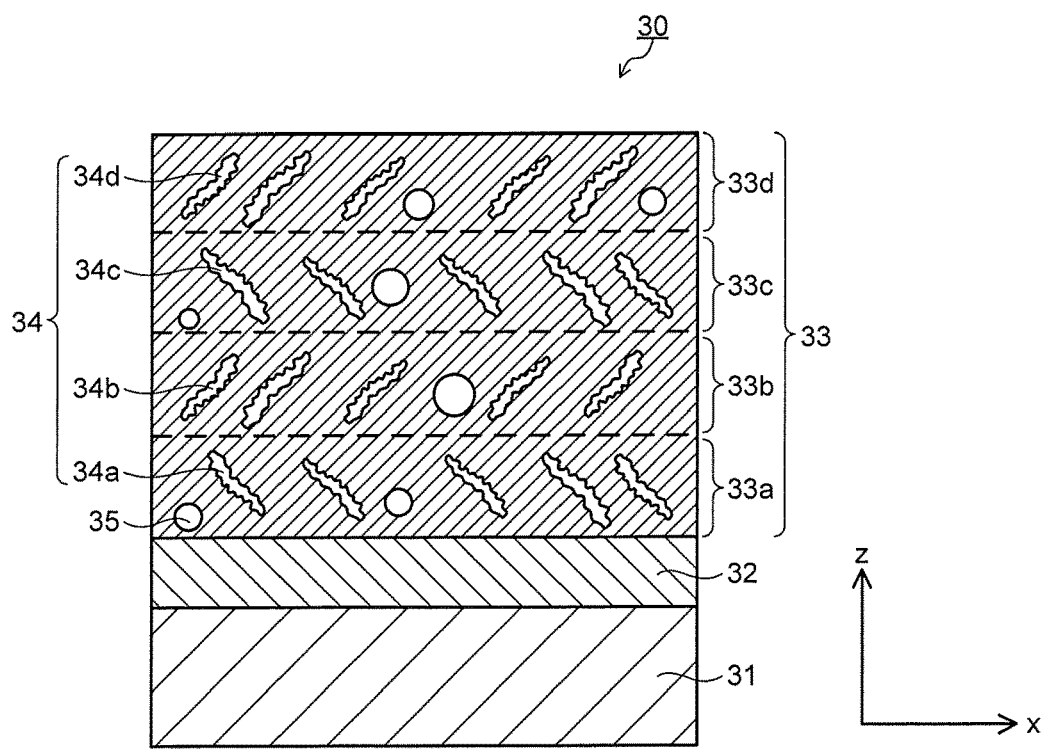
FIG. 3 is a cross-sectional view schematically illustrating a thermal insulation coating member according to the embodiment.

FIG. 3 is a cross-sectional view schematically illustrating a thermal insulation coating member 30 according to the embodiment. As illustrated in FIG. 3, the thermal insulation coating member 30 includes a substrate 31, a binding layer 32 formed on the surface of the substrate 31, and a thermal insulation layer 33 formed on the surface of the binding layer 32.

The material of the substrate 31 is not particularly limited and is preferably capable of, at the time of the axial flow turbine 1 being operating, making the substrate constituting the thermal insulation coating member 30 have enough mechanical strength or environment resistance against the operation state of the axial flow turbine 1. The substrate 31 is composed of, e.g., an Ni-based alloy, a Co-based alloy, an Fe-based alloy, or the like.

The binding layer 32 provided between the substrate 31 and thermal insulation layer 33 enhances adhesion of the substrate 31 and thermal insulation layer 33 and improves the high-temperature corrosion resistance and oxidation resistance of the substrate 31 against high-temperature working fluid. The binding layer 32 is preferably made of a metal material having a high concentration of chrome or aluminum and more preferably made of an MCrAlY alloy (M is at least one material selected from Ni and Co) excellent in corrosion resistance and oxidation resistance at high temperature.

The thickness of the binding layer 32 is preferably 0.05 mm or larger and 0.50 mm or smaller and more preferably 0.10 mm or larger and 0.30 mm or smaller. When the thickness of the binding layer 32 falls within the above range, adhesion of the substrate 31 and the thermal insulation layer 33 is enhanced, and the high-temperature corrosion resistance and the oxidation resistance can be imparted.

The thermal insulation layer 33 formed on the surface of the substrate 31 through the binding layer 32 is composed of a plurality of ceramic layers including at least two layers of a first ceramic layer 33a and a second ceramic layer 33b formed on the surface of the first ceramic layer 33a. The plurality of ceramic layers each contain a plurality of flat pores 34 (hereinafter, also referred to merely as "pores") inclined at a predetermined angle in a predetermined direction with respect to the surface of the substrate 31. The thermal insulation layer 33 enhances the thermal insulation of the thermal insulation coating member 30.

The thermal insulation layer 33 may include at least two layers of first and second ceramic layers 33a and 33b. For example, as illustrated in FIG. 3, the thermal insulation layer 33 may include four ceramic layers of first to fourth ceramic layers 33a to 33d.

Figure 4:
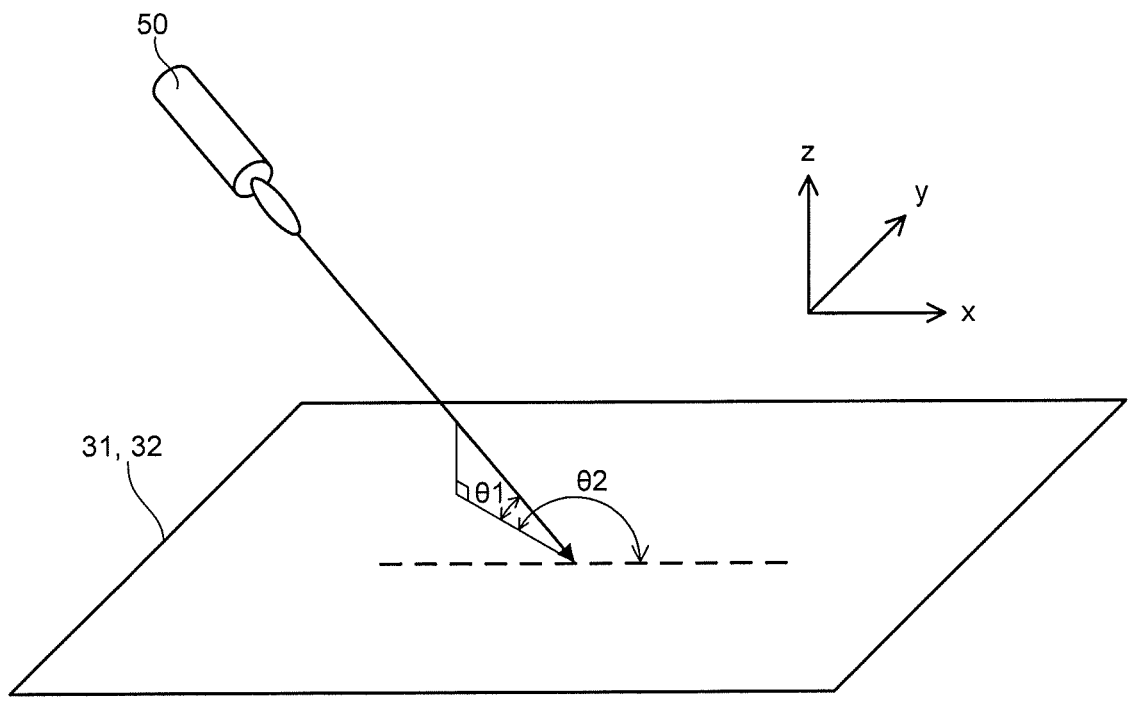
FIG. 4 is a schematic view for explaining the inclination angle and inclination direction of a flat pore contained in the thermal insulation layer constituting the thermal insulation coating member according to the embodiment.
Figure 5:
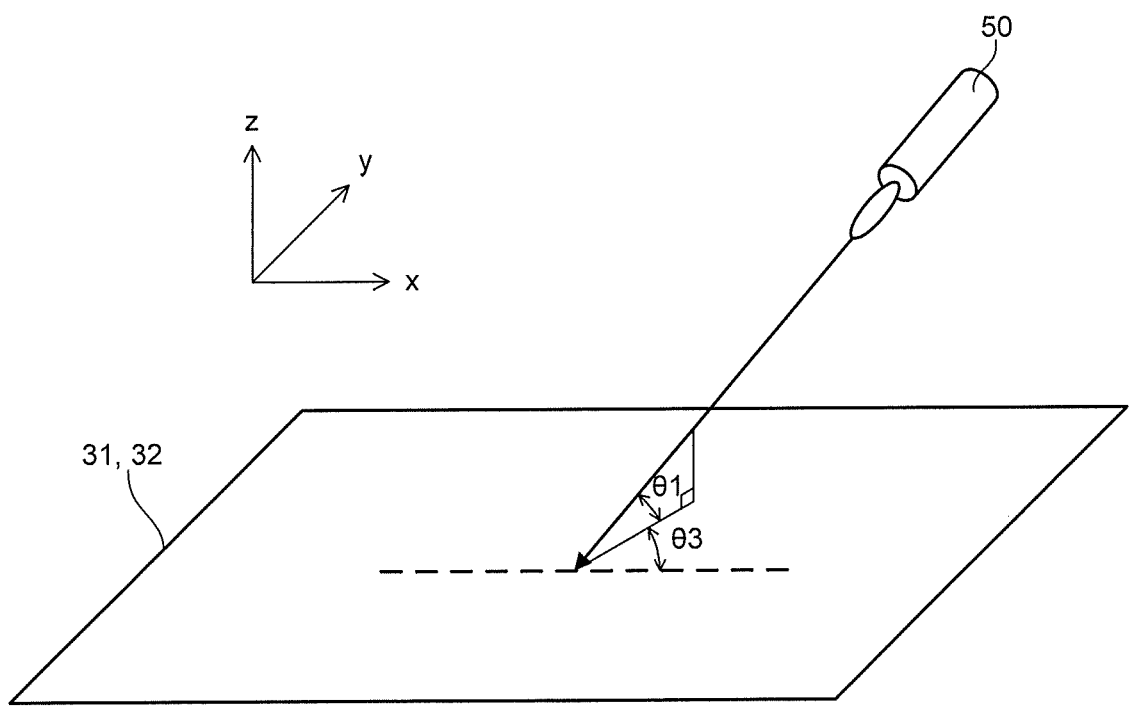
FIG. 5 is a schematic view for explaining the inclination angle and inclination direction of a flat pore contained in the thermal insulation layer constituting the thermal insulation coating member according to the embodiment.

FIGS. 4 and 5 are schematic views for explaining the inclination angle and inclination direction of the flat pore 34 contained in the thermal insulation layer 33 constituting the thermal insulation coating member according to the embodiment. In this example, the thermal insulation layer 33 is formed by means of thermal spraying, but not limited to this. FIG. 4 is a view illustrating the inclination angle and inclination direction of the pore in the first and third ceramic layers 33a and 33c, and FIG. 5 is a view illustrating the inclination angle and inclination direction of the pore in the second and fourth ceramic layers 33b and 33d.

In FIG. 4, thermal spray particles are projected at an angle $\theta1$ with respect to the surface of the substrate 31 and in a direction $\theta2$ with respect to the x-axis. That is, the inclination angle is $\theta1$, and the inclination direction is $\theta2$ with respect to a specific surface (hereinafter, also referred to as "reference surface") parallel to the x-axis and perpendicular to the substrate 31. In FIG. 5, thermal spray particles are projected at an angle $\theta1$ with respect to the surface of the substrate 31 and in a direction $\theta3$ with respect to the x-axis. That is, the inclination angle is $\theta1$, and the inclination direction is $\theta3$ with respect to the reference surface.

As illustrated in FIG. 3, the first ceramic layer 33a formed on the surface of the binding layer 32 contains a plurality of flat pores 34a (hereinafter, also referred to merely as "pores") inclined at a first angle with respect to the surface of the substrate 31 and extending in a first direction. Here, as illustrated in FIG. 4, the first angle of the pore 34a formed in the first ceramic layer 33a is $\theta1$, and the first direction thereof is $\theta2$. In other words, the longitudinal direction of the pore 34a is inclined at the angle $\theta1$ with respect to the surface of the substrate 31 and extends in the direction $\theta2$ with respect to the reference surface. That is, the inclination angle of the pore 34a is $\theta1$ with respect to the surface of the substrate 31.

The longitudinal direction of the flat pore 34 refers to a direction parallel to a straight line in which the total sum of lengths of portions penetrating the pore 34 is maximum. In this case, the straight line may penetrate the pore 34 partially or completely.

As illustrated in FIG. 3, the second ceramic layer 33b formed on the surface of the first ceramic layer 33a contains a plurality of flat pores 34b (hereinafter, also referred to merely as "pores") inclined at a second angle with respect to the surface of the substrate 31 and extending in a second direction. The first and second angles of the pores 34a and 34b and/or the first and second directions of the pores 34a and 34b differ from each other. Here, as illustrated in FIG. 5, the second angle of the pore 34b formed in the second ceramic layer 33b is $\theta1$, and the second direction thereof is $\theta3$. That is, the longitudinal direction of the pore 34b is inclined at the angle $\theta1$ with respect to the surface of the substrate 31 and extends in the direction $\theta3$ with respect to the reference surface. The inclination angle of the pore 34b is $\theta1$ with respect to the surface of the substrate 31.

As illustrated in FIG. 3, the third ceramic layer 33c formed on the surface of the second ceramic layer 33b contains a plurality of flat pores 34c (hereinafter, also referred to merely as "pores") inclined at a third angle with respect to the surface of the substrate 31 and extending in a third direction. The second and third angles of the pores 34b and 34c and/or the second and third directions of the pores 34b and 34c differ from each other. Here, as illustrated in FIG. 4, the third angle of the pore 34c is $\theta1$, and the third direction thereof is $\theta2$.

As illustrated in FIG. 3, the fourth ceramic layer 33d formed on the surface of the third ceramic layer 33c contains a plurality of flat pores 34d (hereinafter, also referred to merely as "pores") inclined at a fourth angle with respect to the surface of the substrate 31 and extending in a fourth direction. The third and fourth angles of the pores 34c and 34d and/or the third and fourth directions of the pores 34c and 34d differ from each other. Here, as illustrated in FIG. 5, the fourth angle of the pore 34d is $\theta1$, and the fourth direction thereof is $\theta3$.

The inclination angles of the pores 34a, 34b, 34c, and 34d contained in the respective ceramic layers 33a, 33b, 33c, and 33d constituting the thermal insulation layer 33 are not limited to those described above as long as the pores 34a, 34b, 34c, and 34d are inclined independently of each other at an angle of 20° or more and less than 90° with respect to the surface of the substrate 31. That is, the first angle of the pore 34a, second angle of the pore 34b, third angle of the pore 34c, and fourth angle of the pore 34d are 20° or more and less than 90° independently of each other.

When the first, second, third, and fourth angles fall within the above range, the peeling resistance of the ceramic layers 33a, 33b, 33c, 33d constituting the thermal insulation layer 33 is high, and the peeling strength of the thermal insulation layer 33 against the binding layer 32 is enhanced. The first, second, third, and fourth angles may be 20° or more, and the peeling strength of the thermal insulation layer 33 increases as the first, second, third, and fourth angles are increased. On the other hand, when the first, second, third, and fourth angles are 0° or more and less than 20°, the film formation of the ceramic layers 33a, 33b, 33c, and 33d becomes difficult, and the peeling resistance of the ceramic layers 33a, 33b, 33c, and 33d is significantly deteriorated.

The first direction of the pore 34a, the second direction of the pore 34b, the third direction of the pore 34c, and the fourth direction of the pore 34d are not particularly limited. Further, all of or some of the above directions may be the same, or all of the above directions may differ from each other.

Further, the peeling resistance of the ceramic layers becomes higher as the difference between the inclination angles or inclination directions of pores contained in the adjacent ceramic layers becomes larger.

As illustrated in FIG. 3, the ceramic layers 33a, 33b, 33c, and 33d constituting the thermal insulation layer 33 also contain spherical pores 35 (hereinafter, also referred to merely as "pores") in addition to the flat pores 34a, 34b, 34c, and 34d. However, the existence ratio of the pores 35 to the flat pores 34a, 34b, 34c, and 34d is very low, and the pores 35 distinctly differ in structure from the flat pores 34a, 34b, 34c, and 34d. Specifically, the shape of the pores 34a, 34b, 34c, and 34d is close to an extremely flat elliptical shape. Assuming that the ratio between the length of the flat pore in the longitudinal direction and the length thereof in a direction perpendicular to the longitudinal direction is defined as flatness, the flatness of the pores 34a, 34b, 34c, and 34d is 5 or more and 300 or less, whereas the shape of the pores 35 is close to a sphere, and the flatness of the pores 35 is 1 or more and less than 5. Hereinafter, unless otherwise specified, the flat pores 34a, 34b, 34c, and 34d and pores 35 are distinguished from each other.

The longitudinal length of the flat pores 34a, 34b, 34c, and 34d is 50 μm or larger and 300 μm or smaller. The diameter of the pores 35 is 5 μm or larger and 30 μm or smaller.

The thermal insulation layer 33 preferably has a porosity of 5% or more and 30% or less. The porosity of the thermal insulation layer 33 refers to the porosity concerning the flat pores 34 and pores 35. When the porosity of the thermal insulation layer 33 is less than 5%, the thermal conductivity of the thermal insulation layer 33 increases, which may deteriorate the thermal insulation of the thermal insulation coating member 30. On the other hand, when the porosity of the thermal insulation layer 33 exceeds 30%, the strength of the thermal insulation layer 33 itself is lowered, which may reduce reliability of the thermal insulation coating member 30.

The porosity of the thermal insulation layer 33 can be calculated by observing the cross section of the thermal insulation layer 33 using a microscope such as SEM. Specifically, the porosity of the thermal insulation layer 33 can be calculated from the area of the pores appearing in a micrograph.

The ceramic layers 33a, 33b, 33c, and 33d constituting the thermal insulation layer 33 are made of zirconia, alumina, yttria, or magnesia independently of each other. Among them, the ceramic layers 33a, 33b, 33c, and 33d are each preferably made of zirconia in order to make the thermal conductivity of the thermal insulation layer 33 low. The materials of the respective ceramic layers 33a, 33b, 33c, and 33d are appropriately selected according to the type of the material constituting the substrate 31 so as to make the thermal conductivity of the thermal insulation layer 33 lower than the thermal conductivity of the substrate 31.

For example, when the substrate 31 is made of an Ni-based alloy, the thermal conductivity of the Ni-based alloy at a room temperature is generally 10 W/(m·k) or more. On the other hand, when the ceramic layers 33a, 33b, 33c, and 33d are made of zirconia having a thermal conductivity of 5 W/(m·k) or less at a room temperature, the thermal conductivity of the thermal insulation layer 33 is lower than the thermal conductivity of the substrate 31 without fail. As a result, the thermal insulation coating member 30 exhibits excellent thermal insulation.

The ceramic layers 33a, 33b, 33c, and 33d preferably include at least one stabilizing material selected from a group consisting of magnesia, calcia, and yttria and more preferably made of zirconia including at least one stabilizing material selected from the above group. When the ceramic layers 33a, 33b, 33c, and 33d include the above stabilizing material, cracking of the ceramic layers 33a, 33b, 33c, and 33d associated with crystal phase transformation under high temperatures is suppressed. Particularly, when the above stabilizing material is included in the fourth ceramic layer 33d which is the outermost surface layer of the thermal insulation layer 33, the cracking suppression effect is further enhanced.

The ceramic layers 33a, 33b, 33c, and 33d preferably include at least one rare-earth element selected from a group consisting of hafnia, ceria, and dysprosia and more preferably made of zirconia including at least one rare-earth element selected from the above group. During operation of the axial flow turbine 1, the temperature of the outermost surface of the thermal insulation layer 33 constituting the thermal insulation coating member 30 becomes high. When the high-temperature thermal insulation layer 33 is sintered, the structure and volume of the thermal insulation layer 33 change, which may increase the possibility of bringing about an increase in the thermal conductivity of the thermal insulation layer 33 or peeling of the thermal insulation layer 33. When the ceramic layers 33a, 33b, 33c, and 33d include the above rare-earth element which is a hardly sinterable element, the sinterability of the ceramic layers 33a, 33b, 33c, and 33d is reduced, so that it is possible to suppress an increase in the thermal conductivity of the thermal insulation layer 33 and to enhance the peeling resistance of the thermal insulation layer 33. Particularly, when the above hardly-sinterable element is included in the fourth ceramic layer 33d that is the outermost surface layer of the thermal insulation layer 33, the sinterability suppression effect is further enhanced. Further, the sintering resistance can be enhanced by using a high-purity material free from a comparatively low melting point material such as silica for the material constituting the ceramic layers 33a, 33b, 33c, and 33d, whereby reliability under high temperatures can be enhanced.

When the ceramic layers 33a, 33b, 33c, and 33d include the stabilizing material in addition to the above rare-earth element, not only the thermal conductivity suppression effect and peeling suppression effect, but also the cracking suppression effect can be exhibited.

The thickness of the thermal insulation layer 33 is appropriately selected according to the temperature of the working fluid or cooling gas in the axial flow turbine 1 and is preferably, e.g., 0.1 mm or larger and 1.0 mm or smaller. When the thickness of the thermal insulation layer 33 is 0.1 mm or larger, the heat insulation of the thermal insulation coating member 30 becomes high. When the thickness of the thermal insulation layer 33 is 1.0 mm or smaller, peeling of the thermal insulation layer 33 from the binding layer 32 is suppressed. All of or some of the thicknesses of the ceramic layers 33a, 33b, 33c, and 33d may be the same, or all of the thicknesses thereof may differ from each other.

Next, the reason that the thermal insulation layer 33 having the plurality of flat pores 34 inclined with respect to the surface of the substrate 31 has excellent peeling resistance will be described.

As illustrated in FIG. 3, when the pores 34 contained in the adjacent ceramic layers differ from each other in the inclination angle or inclination direction, the physical properties such as mechanical characteristics of the thermal insulation layer 33 tend to become isotropic. In the thermal insulation layer 33 having isotropic physical properties, the peeling resistance is enhanced.

On the other hand, when the pores 34 contained in the ceramic layers have the same inclination angle and same inclination direction, the physical properties of the thermal insulation layer 33 become anisotropic. In the thermal insulation layer 33 having anisotropic mechanical characteristics, the thermal expansion difference between the substrate 31 and the thermal insulation layer 33 becomes large, which may cause peeling of the thermal insulation layer 33. Thus, when the pores 34 formed inside the thermal insulation layer 33 are inclined in a uniform direction, the peeling resistance of the thermal insulation layer 33 is significantly deteriorated at, particularly, the end portion of the thermal insulation layer. Further, when the thermal insulation layer 33 has the pores 34 inclined in a uniform direction, the pores 34 may act as a defect inside the thermal insulation layer 33.

Next, a manufacturing method for the thermal insulation coating member according to the embodiment will be described.

The thermal insulation coating member manufacturing method includes a binding layer forming step (hereinafter, also referred to as "primary step") of forming the binding layer 32 on the surface of the substrate 31 and a thermal insulation layer forming step (hereinafter, also referred to as "secondary step") of forming the thermal insulation layer 33 on the surface of the binding layer 32 formed in the primary step.

First, the primary step will be described.

In the primary step, the binding layer 32 is formed on the surface of the substrate 31. The binding layer 32 can be formed by depositing particles, clusters, or molecules of a metal layer structural material such as an MCrAlY alloy (M is at least one material selected from Ni and Co) in a uniform film shape by a thermal spray method, an electron beam vapor deposition method, or the like. In this primary step, a substrate 31 having the binding layer 32 on its surface may be prepared.

Next, the secondary step will be descried.

In the secondary step, the thermal insulation layer 33 having the pores 34 is formed on the surface of the binding layer 32. As illustrated in FIG. 3, the thermal insulation layer 33 is composed of the four ceramic layers 33a, 33b, 33c, and 33d. The thermal insulation layer 33 is formed on the binding layer 32 by a known method such as a thermal spray method, or an electron beam vapor deposition method.

Figure 6:
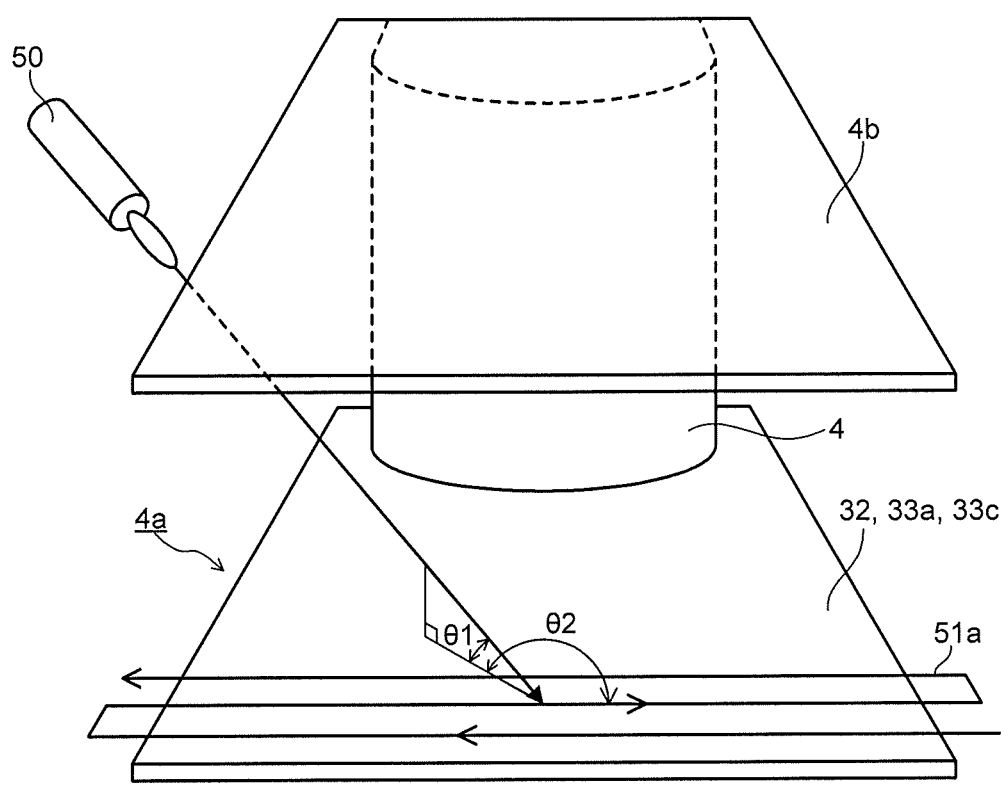
FIG. 6 is a schematic view illustrating a manufacturing method for the thermal insulation coating member according to the embodiment.
Figure 7:
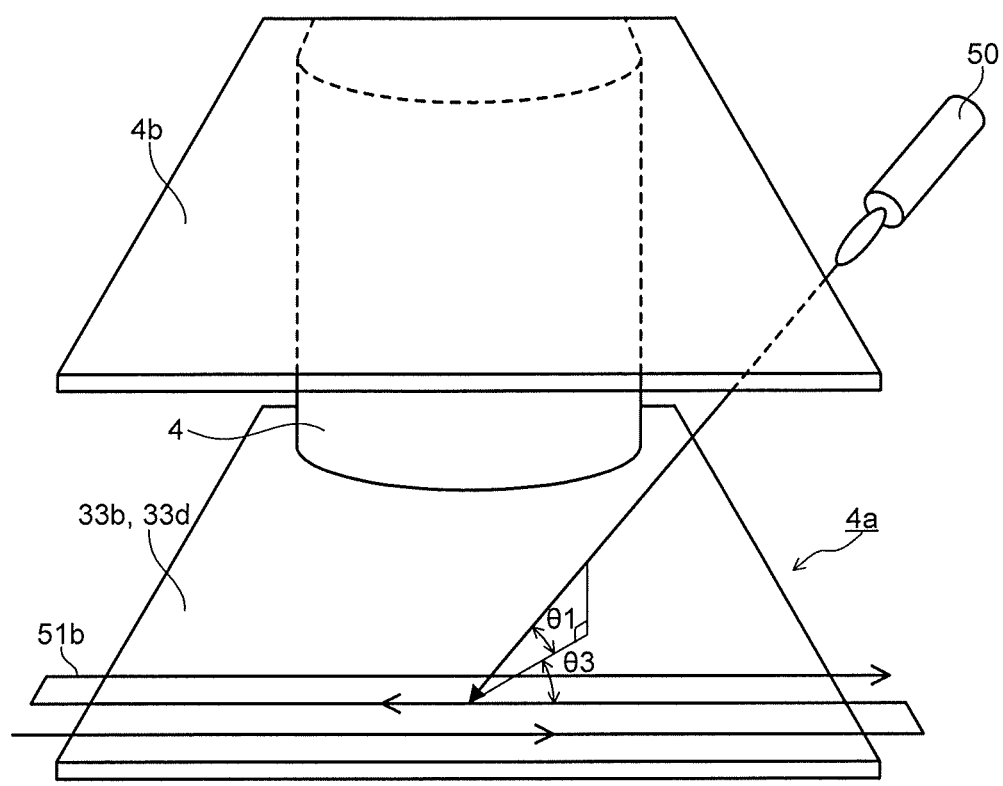
FIG. 7 is a schematic view illustrating a manufacturing method for the thermal insulation coating member according to the embodiment.

FIGS. 6 and 7 are schematic views each illustrating the manufacturing method for the thermal insulation coating member according to the embodiment. Here, as one example, the thermal insulation layer 33 is formed on the inner side wall 4a surrounded by the stationary blade 4 and an outer side wall 4b. In this example, the thermal insulation layer 33 is formed by means of thermal spraying. FIG. 6 is a schematic view illustrating a state where the first ceramic layer 33a and third ceramic layer 33c are formed, and FIG. 7 is a schematic view illustrating a state where the second ceramic layer 33b and fourth ceramic layer 33d are formed.

As illustrated in FIGS. 6 and 7, a thermal spray application surface such as the binding layer 32 formed on the surface of the inner side wall 4a faces the outer side wall 4b. When the thermal insulation layer 33 needs to be formed on the thermal spray application surface existing in such a narrow portion, it is difficult to perform thermal spraying with a thermal spray gun 50 installed perpendicularly to the substrate 31. Thus, the thermal spraying is performed with the thermal spray gun 50 inclined by a predetermined angle with respect to the substrate 31.

When the first ceramic layer 33a is formed on the surface of the binding layer 32 as the thermal spray application surface, the thermal spray gun 50 is set such that the first angle and first direction are θ1 and θ2, respectively, as illustrated in FIG. 6. Then, thermal spray particles are sprayed onto the binding layer 32 from the thermal spray gun 50 with the thermal spray gun 50 moved along a scanning direction 51a. At this time, the thermal spray gun 50 is moved while maintaining the θ1 and θ2. The thermal spray gun 50 is moved at a constant speed by a known means such as a robot arm. The thermal spraying is ended when the thickness of the first ceramic layer 33a reaches a predetermined value. The plurality of flat pores 34a inclined at the inclination angle θ1 and extending in the direction θ2 are formed inside the first ceramic layer 33a formed by means of thermal spraying.

Subsequently, the second ceramic layer 33b is formed on the surface of the first ceramic layer 33a as the thermal spray application surface. At this time, as illustrated in FIG. 7, the thermal spray gun 50 is set such that the second angle and second direction are θ1 and θ3, respectively. Then, thermal spray particles are sprayed onto the first ceramic layer 33a from the thermal spray gun 50 with the thermal spray gun 50 moved along a scanning direction 51b. At this time, the thermal spray gun 50 is moved while maintaining the θ1 and θ3. The thermal spray is ended when the thickness of the second ceramic layer 33b reaches a predetermined value. The plurality of flat pores 34b inclined at the inclination angle θ1 and extending in the direction θ3 are formed inside the second ceramic layer 33b formed by the thermal spray.

Subsequently, the third ceramic layer 33c is formed in the same manner as for the first ceramic layer 33a by means of thermal spraying, and then the fourth ceramic layer 33d is formed in the same manner as for the second ceramic layer 33b by means of thermal spaying.

In this way, the thermal insulation layer 33 composed of the four ceramic layers 33a, 33b, 33c, and 33d is formed by means of thermal spraying. The thermal insulation layer 33 contains the pores 34 whose inclination angle and extending direction are different between the ceramic layers. In order to prevent the film characteristics of the thermal insulation layer 33 such as the porosity from being deteriorated, it is preferable not to apply thermal treatment such as sintering for densification to the thermal insulation layer 33 obtained by way of the thermal spraying.

The pores 34 are formed in the process that the thermal spray particles are deposited on the thermal spray application surface. The inclination angle and inclination direction of the pores 34 are determined by the projection angle and projection direction of the thermal spray particles. For example, when the thermal spray particles are projected with the first angle and first direction set to θ1 and θ2, respectively, the first angle and first direction of the pores 34 formed inside the thermal insulation layer 33 are θ1 and θ2, respectively. By thus appropriately changing the projection angle and projection direction of the thermal spray particles from the thermal spray gun 50 and the moving speed and the operation frequency of the thermal spray gun 50, the longitudinal length, inclination direction, and inclination angle of the pores 34 can be adjusted.

When the thermal spraying is performed such that the pores 34 inside the thermal insulation layer 33 have the same inclination angle and the same inclination direction, some of the thermal spray particles projected from the thermal spray gun 50 may splash on the end portion of the thermal spray application surface. Since defects are concentrated on the end portion of the thermal insulation layer 33 formed by such thermal spraying, the peeling resistance of the thermal insulation layer 33 is deteriorated.

When the θ1 of the thermal spray gun 50 at the thermal spray is 0° or more and less than 20°, the projection angle of the thermal spray particles with respect to the thermal spray application surface is very small, which may significantly increase the porosity of the thermal insulation layer 33 to be formed. When the porosity of the thermal insulation layer 33 increases, the strength of the thermal insulation layer 33 lowers.

The shape of the thermal spray particles has influence on the shape of the pores 34. In the secondary step, it is preferable to form the ceramic layers 33a, 33b, 33c, and 33d by thermally spraying hollow thermal spray particles. When the thermal spray particles are hollow, the inclination direction of the pores 34 formed inside the ceramic layers 33a, 33b, 33c, and 33d can be easily controlled. On the other hand, when the thermal spray particles are granulated powder or melted/pulverized powder, it is not easy to control the inclination direction of the formed pores 34.

As described above, according to the thermal insulation coating member and the thermal insulation coating member manufacturing method of the embodiment, a thermal insulation layer containing the pores different in the inclination angle or inclination direction between the adjacent ceramic layers can be formed. Such a thermal insulation layer has peeling resistance equivalent to that of a thermal insulation layer formed by the conventional thermal spray method in which the thermal spray particles are projected at a large angle. Thus, even when a thermal insulation layer formed in a narrow portion where it is difficult to project the thermal spray particles at a large angle is used to form a thermal insulation coating member, the obtained thermal insulation coating member can have high durability. Since a thermal insulation layer having high durability can be formed even in a narrow portion where it is conventionally difficult to project the thermal spray particles at a large angle, manufacturability is improved.

EXAMPLES

Hereinafter, the present invention is further described using Examples, but the scope of the present invention is not limited at all to the following Examples.

Example 1

A substrate made of an Ni-based alloy and having a binding layer made of an NiCrAlY alloy was prepared. Then, thermal spraying was performed in the manner illustrated in FIGS. 6 and 7 to form a thermal insulation layer made of yttria-stabilized zirconia on the binding layer. In the thermal spraying, a process of projecting thermal spray particles with the projection angle and projection direction set to θ1=45° and θ2=135°, respectively, and projecting the thermal spray particles with the projecting angle maintained at θ1=45° and the projection angle set to θ3=45° was repeatedly performed to form a thermal insulation layer having a thickness of 0.4 mm. Each of the ceramic layers constituting the thermal insulation layer had a uniform thickness of about 0.02 mm.

Comparative Example 1

A thermal insulation layer was formed in the same way as in Example 1 except that the thermal spray particles were projected with the projection angle and projection direction set to θ1=45° and θ2=135°, respectively. That is, the projection angle and projection direction of the thermal spray particles were fixed, and the projection angle was inclined with respect to the substrate.

Comparative Example 2

A thermal insulation layer was formed in the same way as in Example 1 except that the thermal spray particles were projected with the projection angle and projection direction set to θ1=90° and θ2=90°, respectively. That is, the projection angle and projection direction of the thermal spray particles were fixed, and the projection angle was not inclined with respect to the substrate.

The peeling resistance was evaluated for the thermal insulation layers obtained in Example 1 and Comparative Examples 1 and 2. In the evaluation, a thermal cycle process of heating the thermal insulation layer to 1100° C. and then cooling it to a room temperature was repeated 100 times. FIG. 8 shows the evaluation result of the peeling resistance in Example and Comparative Examples.

In Example 1, the peeling of the thermal insulation layer did not occur even after the above thermal cycle process was performed 100 times. This result is equivalent to the result of the Comparative Example 2. That is, the peeling resistance in this result is equivalent to the peeling resistance of the thermal insulation layer obtained by the conventional thermal spraying in which the thermal spray particles are projected perpendicularly to the substrate. On the other hand, in Comparative Example 1, the peeling of the thermal insulation layer occurred after the thermal cycle process had been performed 15 times. These results reveal that it is possible to form a thermal insulation layer excellent in long-term durability even in a narrow portion where the thermal spraying cannot be performed under satisfactory conditions.

Thus, according to the embodiment of the present invention, there can be provided a thermal insulation coating member, an axial flow turbine, and a thermal insulation coating member manufacturing method capable of maintaining the durability of the thermal insulation layer formed on the surface of the high-temperature member even in a narrow portion and thus of ensuring high thermal insulation for the high-temperature member.

Although some embodiments of the present invention have been described above, the embodiments are merely illustrative and do not limit the scope of the present invention. These novel embodiments can be practiced in other various forms, and various omissions, substitutions and changes may be made without departing from the scope of the invention. The embodiments and modifications thereof are included in the scope or spirit of the present invention and in the appended claims and their equivalents.

What is claimed:

1. A thermal insulation coating member comprising:
    a substrate having a surface;
    a binding layer on the surface; and
    a thermal insulation layer on the binding layer,
    the thermal insulation layer including:
        a first ceramic layer having a plurality of first flat pores, the plurality of first flat pores being inclined at a first angle with respect to the surface and extending in a first direction; and
        a second ceramic layer having a plurality of second flat pores, the plurality of second flat pores being inclined at a second angle with respect to the surface and extending in a second direction,
    the second angle differing from the first angle, the second direction differing from the first direction, or the second angle and the second direction respectively differing from the first angle and the first direction, wherein
    each of the first and second angles is 20° or more and less than 90°.

2. The thermal insulation coating member according to claim 1, wherein
    the thermal insulation layer has a porosity of 5% or more and 30% or less.

3. The thermal insulation coating member according to claim 1, wherein
    a flatness of each of the plurality of first flat pores and the plurality of second flat pores is 5 or more and 300 or less.

4. The thermal insulation coating member according to claim 1, wherein
    each of the first and second ceramic layers has a zirconia, an alumina, an yttria, or magnesia.

5. The thermal insulation coating member according to claim 1, wherein
    each of the first and second ceramic layers has a zirconia containing at least one stabilizer selected from the group consisting of a magnesia, a calcia, and an yttria.

6. The thermal insulation coating member according to claim 1, wherein
    each of the first and second ceramic layers contains at least one rare-earth compound selected from the group consisting of a hafnia, a ceria, and a dysprosia.

7. An axial flow turbine comprising:
    an inner casing;
    a turbine rotor provided through the inner casing and having a plurality of rotor disks arranged in an axial direction of the turbine rotor;
    a plurality of moving blades, each moving blade including a blade effective part, a platform part, a shank part, and an implanted part, and each moving blade being provided on each rotor disk in a circumferential direction of the turbine rotor;
    a shroud segment surrounding an outer periphery of one of the plurality of moving blades;
    a plurality of stationary blades provided in the circumferential direction in the inner casing, the plurality of stationary blades and the plurality of moving blades being alternately arranged in the axial direction to form a plurality of turbine stages;
    an inner side wall provided on a inner periphery of one of the plurality of stationary blades; and
    a transition piece to exhaust working fluid to a first stage of the plurality of turbine stages, wherein
    at least one member selected from the group consisting of the platform part, each moving blade, the shroud segment, each stationary blade, the inner side wall, and the transition piece includes a thermal insulation coating member according to claim 1.

8. A method of manufacturing a thermal insulation coating member, comprising:
    forming a binding layer on a surface of a substrate; and
    forming a thermal insulation layer on the binding layer,
    the thermal insulation layer including:
        a first ceramic layer having a plurality of first flat pores, the plurality of first flat pores being inclined at a first angle with respect to the surface and extending in a first direction; and
        a second ceramic layer having a plurality of second flat pores, the plurality of second flat pores being inclined at a second angle with respect to the surface and extending in a second direction,
    the second angle differing from the first angle, the second direction differing from the first direction, or the second angle and the second direction respectively differing from the first angle and the first direction, wherein
    each of the first and second ceramic layers is formed by depositing thermal sprayed hollow particles.

* * * * *